US012789290B2

(12) United States Patent
Ko et al.

(10) Patent No.: US 12,789,290 B2
(45) Date of Patent: Nov. 10, 2026

(54) TIGHT-CONTACT JIG FOR SECONDARY BATTERY TAB LASER WELDING AND WELDING METHOD

(71) Applicant: LG Energy Solution, Ltd., Seoul (KR)

(72) Inventors: Myoung Jin Ko, Daejeon (KR); Dong Hyeuk Park, Daejeon (KR); Hyo Jin Lee, Daejeon (KR); Sung Jun Jo, Daejeon (KR); Gil Woo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1296 days.

(21) Appl. No.: 17/631,177

(22) PCT Filed: Sep. 28, 2020

(86) PCT No.: PCT/KR2020/013198

§ 371 (c)(1),
(2) Date: Jan. 28, 2022

(87) PCT Pub. No.: WO2021/080207

PCT Pub. Date: Apr. 29, 2021

(65) Prior Publication Data

US 2022/0184738 A1 Jun. 16, 2022

(30) Foreign Application Priority Data

Oct. 23, 2019 (KR) ........................ 10-2019-0131954

(51) Int. Cl.
*B23K 26/22* (2006.01)
*H01M 50/536* (2021.01)

(52) U.S. Cl.
CPC ........... *B23K 26/22* (2013.01); *H01M 50/536* (2021.01)

(58) Field of Classification Search
CPC .. B23K 26/22; B23K 2101/006; B23K 26/14; B23K 26/1476; B23K 37/0443;
(Continued)

(56) References Cited

U.S. PATENT DOCUMENTS 7,259,353 B2 8/2007 Guo
2004/0226927 A1 11/2004 Morikazu et al.
(Continued)

FOREIGN PATENT DOCUMENTS

CA 2009127 A1 8/1990
CN 201329320 Y 10/2009
(Continued)

OTHER PUBLICATIONS

Machine translation of JP-2014136254-A, Mar. 2025 (Year: 2025).*
(Continued)

*Primary Examiner* — Steven W Crabb
*Assistant Examiner* — Keith Brian Assante
(74) *Attorney, Agent, or Firm* — Lerner David LLP

(57) ABSTRACT

Disclosed are a tight-contact jig for secondary battery tab laser welding including an upper tight-contact jig including a ring-shaped spray portion capable of performing surface spray in order to inhibit deterioration in weld quality due to reaction with hydrogen or oxygen in air at the time of laser welding for forming an electrode terminal and to inhibit the occurrence of short circuit due to deposition of spatter generated at the time of welding and a welding method.

16 Claims, 8 Drawing Sheets

(58) Field of Classification Search
CPC ........................ B23K 2101/36; B23K 2101/38; B23K 26/21; B23K 26/702; H01M 50/536; H01M 50/531; Y02E 60/10
See application file for complete search history.

(56) References Cited

U.S. PATENT DOCUMENTS

| | | | | |
|---|---|---|---|---|
| 2006/0065650 A1 | | 3/2006 | Guo | |
| 2006/0157457 A1 | | 7/2006 | Sakurai et al. | |
| 2010/0078413 A1 | | 4/2010 | Hosokawa et al. | |
| 2016/0193694 A1 | * | 7/2016 | Dinkelman .......... | B23K 26/244 219/121.64 |
| 2019/0312255 A1 | * | 10/2019 | Dai ........................ | B23K 26/22 |

FOREIGN PATENT DOCUMENTS

| | | | | | |
|---|---|---|---|---|---|
| CN | 101712103 | A | | 5/2010 | |
| CN | 207043555 | U | * | 2/2018 | |
| DE | 102017214025 | A1 | * | 2/2019 | ............. B23K 26/03 |
| JP | H02258186 | A | | 10/1990 | |
| JP | H0584589 | A | | 4/1993 | |
| JP | 06304777 | A | * | 11/1994 | |
| JP | H06304777 | A | | 11/1994 | |
| JP | 2001150169 | A | | 6/2001 | |
| JP | 2002028796 | A | | 1/2002 | |
| JP | 2002164037 | A | | 6/2002 | |
| JP | 2004337947 | A | | 12/2004 | |
| JP | 2005254328 | A | | 9/2005 | |
| JP | 2012000648 | A | * | 1/2012 | |
| JP | 2014136254 | A | * | 7/2014 | |
| JP | 2014161909 | A | * | 9/2014 | |
| JP | 2016002566 | A | | 1/2016 | |
| JP | 2016018756 | A | | 2/2016 | |
| JP | 6295861 | B2 | | 3/2018 | |
| KR | 20180112616 | A | | 10/2018 | |

OTHER PUBLICATIONS

Machine translation of JP-2012000648-A, Mar. 2025 (Year: 2025).*
Machine translation of JP-2014161909-A, Mar. 2025 (Year: 2025).*
Machine translation of JP-H06304777-A, Mar. 2025 (Year: 2025).*
Machine translation of DE-102017214025-A1, Mar. 2025 (Year: 2025).*
Machine translation of CN-207043555-U, Mar. 2025 (Year: 2025).*
Extended European Search Report including Written Opinion for Application No. 20878098.1 dated Jun. 20, 2022, pp. 1-8.
International Search Report for Application No. PCT/KR2020/013198 mailed Jan. 11, 2021, 2 pages.

* cited by examiner

【FIG. 1】
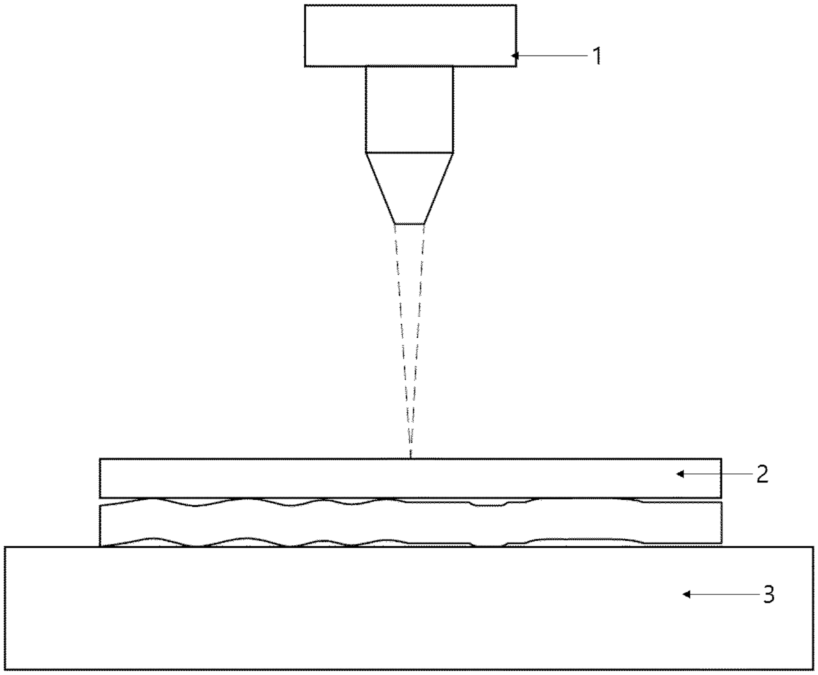
【FIG. 2】
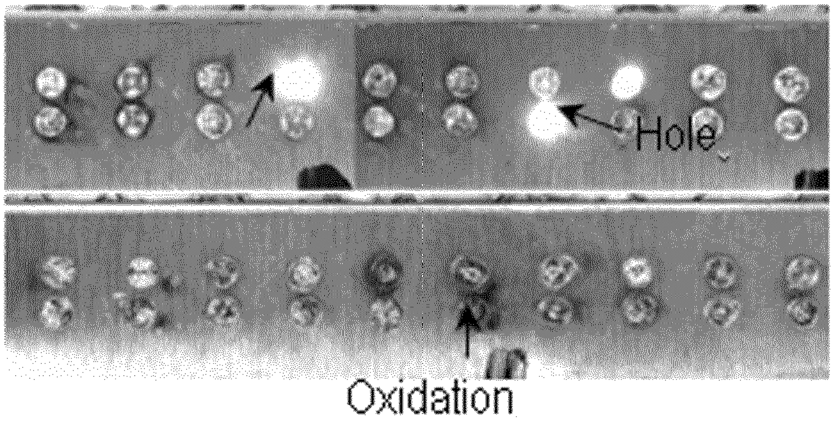

【FIG. 3】
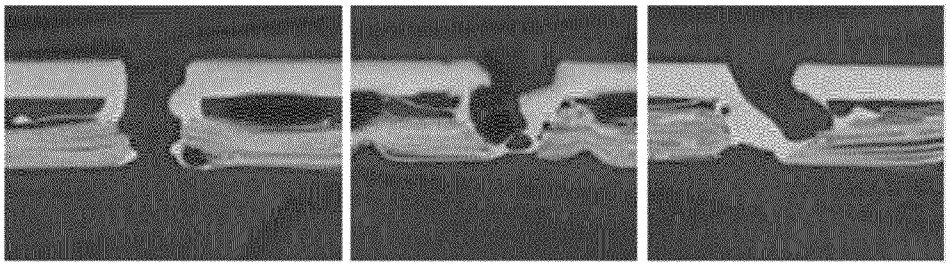
【FIG. 4】
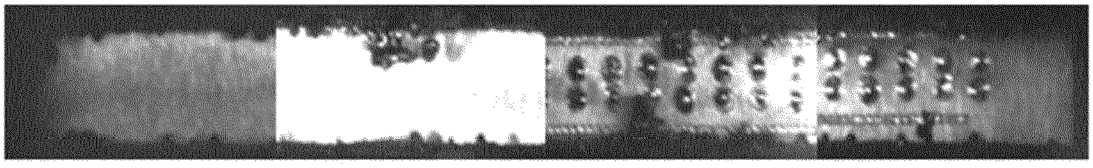
【FIG. 5】
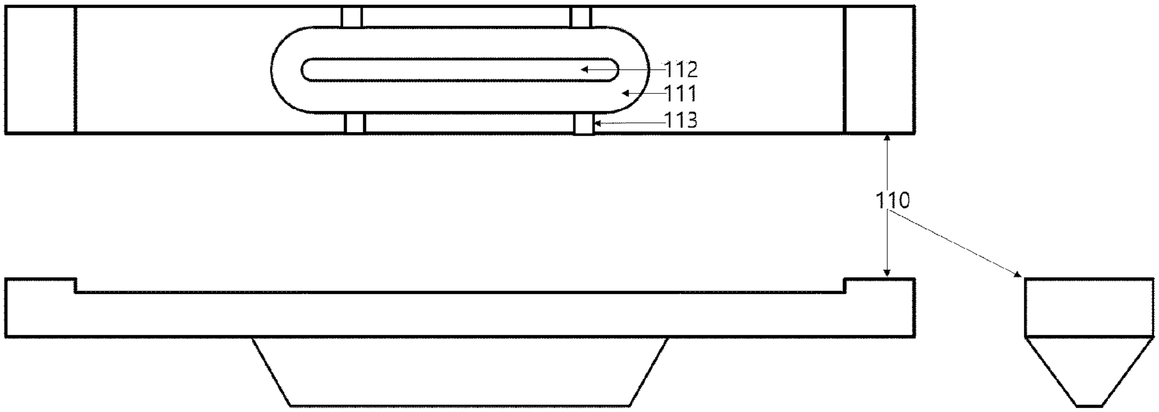

【FIG. 6】
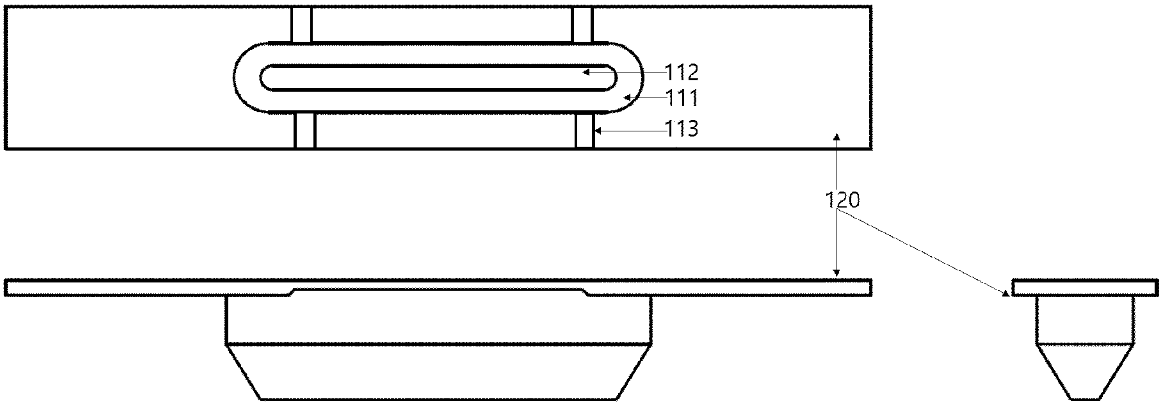

【FIG. 7】
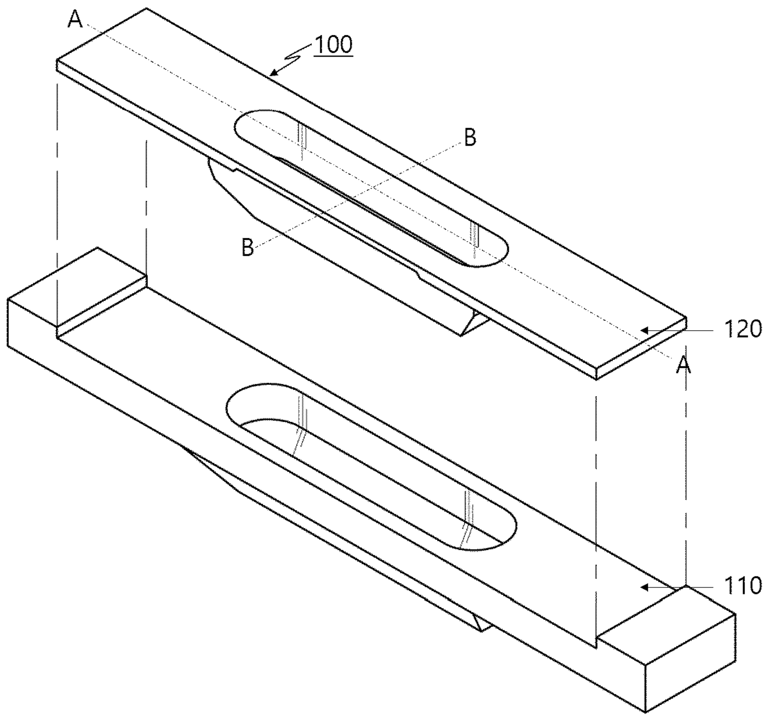
【FIG. 8】
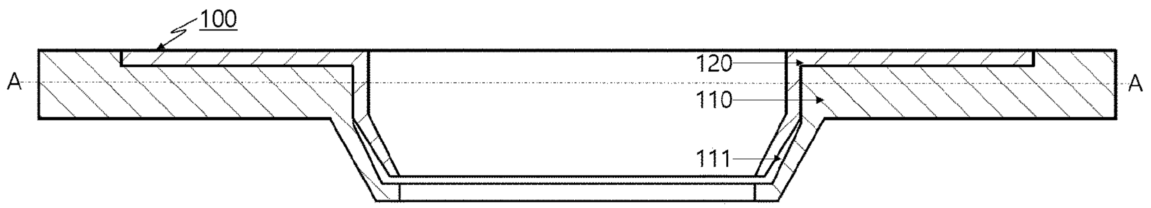

【FIG. 9】
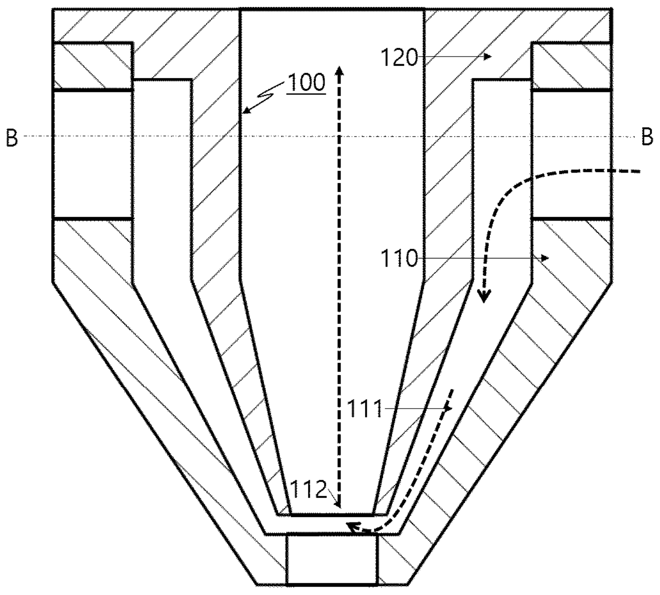

【FIG. 10】
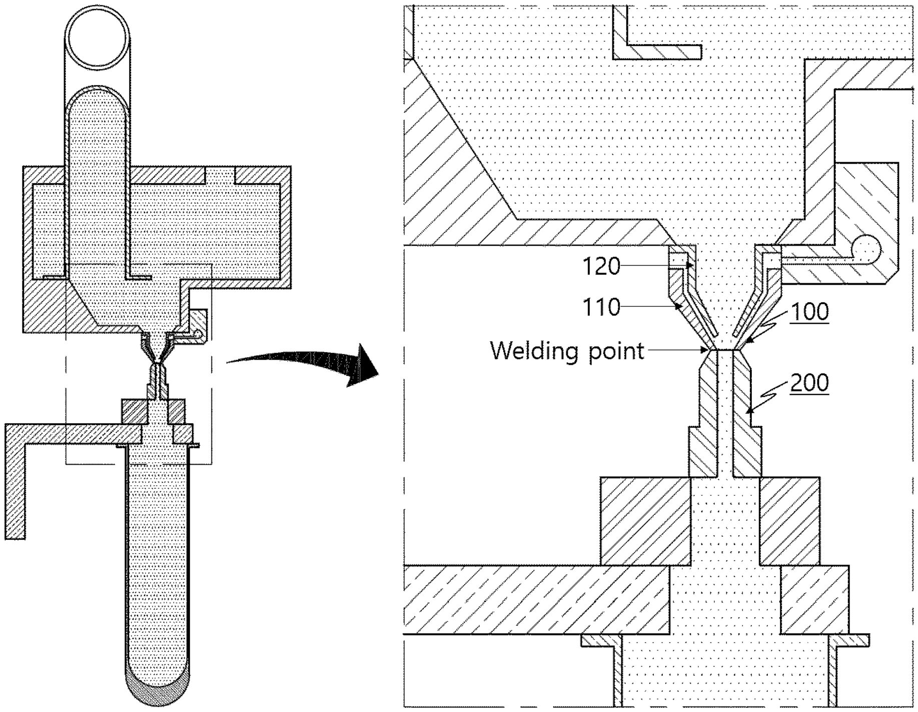

【FIG. 11】
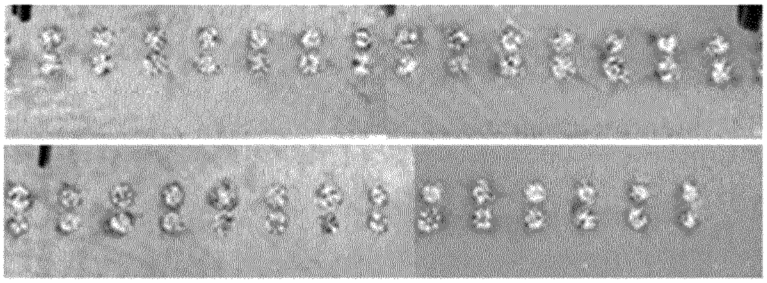
【FIG. 12】
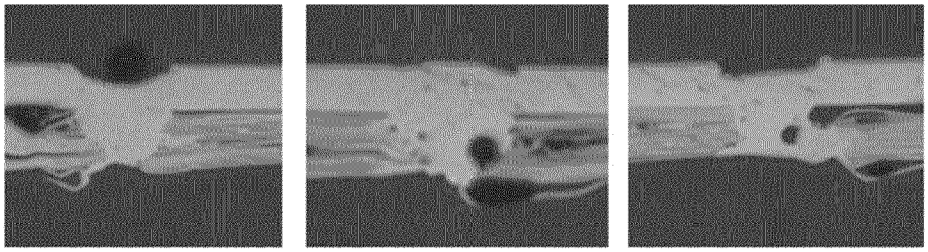
【FIG. 13】
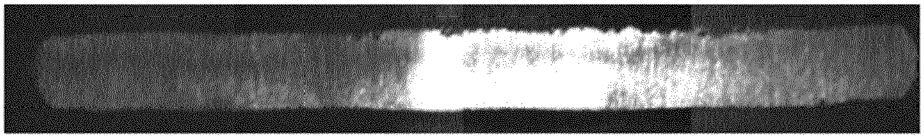

【FIG. 14】
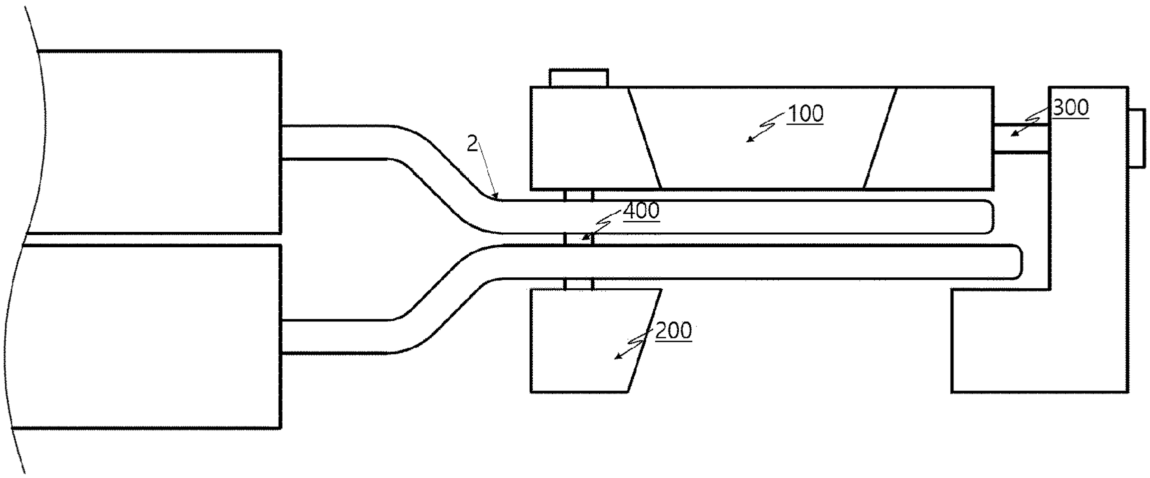
【FIG. 15】
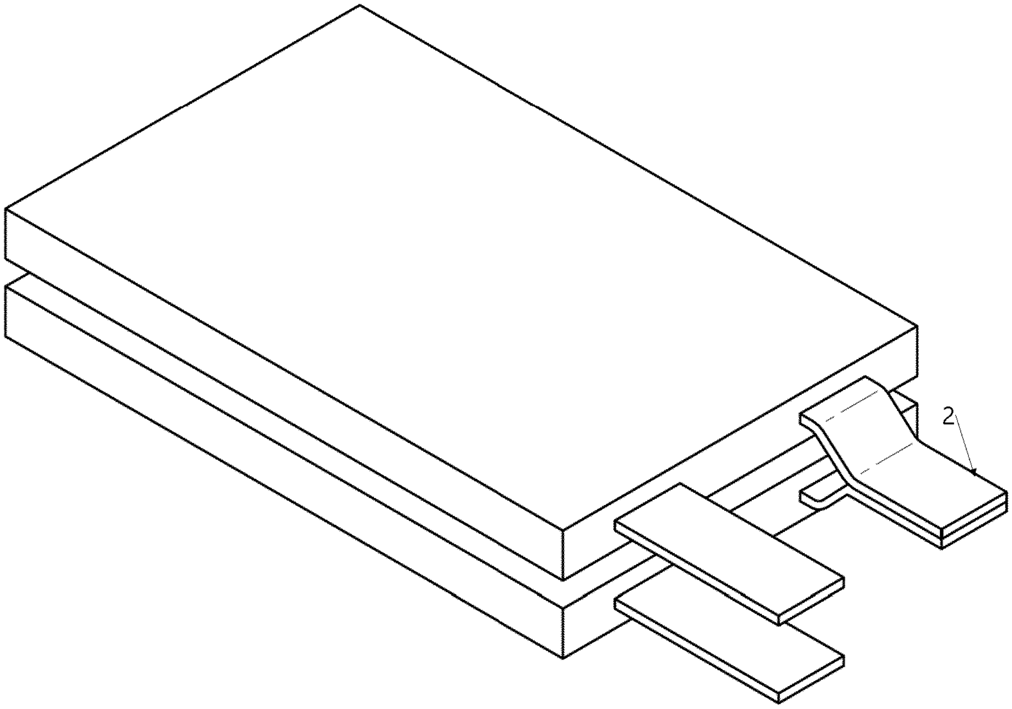

TIGHT-CONTACT JIG FOR SECONDARY BATTERY TAB LASER WELDING AND WELDING METHOD

CROSS-REFERENCE TO RELATED APPLICATIONS

The present application is a national stage entry under 35 U.S.C. § 371 of International Application No. PCT/KR2020/013198, filed on Sep. 28, 2020, published in Korean, which claims priority to Korean Patent Application No. 2019-0131954 filed on Oct. 23, 2019, the entire contents of which are hereby incorporated by reference herein.

TECHNICAL FIELD

The present invention relates to a tight-contact jig for secondary battery tab laser welding and a welding method, and more particularly to a tight-contact jig for secondary battery tab laser welding including an upper tight-contact jig including a ring-shaped spray portion capable of performing surface spray in order to inhibit deterioration in weld quality due to reaction with hydrogen or oxygen in air at the time of laser welding for forming an electrode terminal and to inhibit the occurrence of short circuit due to deposition of spatter generated at the time of welding and a welding method.

BACKGROUND ART

It is forecasted that demand for lithium secondary batteries will continuously increase due to development of an electric vehicle (EV), a hybrid electric vehicle (HEV), and a plug-in hybrid electric vehicle (Plug-In HEV) in addition to mobile devices and electric home appliances. An all solid state battery, which has high stability, high energy density, and a long lifespan, is technology enabling a new market for lithium secondary batteries.

Lithium secondary batteries may be classified into a can-shaped secondary battery having an electrode assembly mounted in a metal can and a pouch-shaped secondary battery having an electrode assembly mounted in a pouch made of an aluminum laminate sheet. A secondary battery is generally manufactured through processes in which an electrolytic solution is injected into a sheathing member in the state in which an electrode assembly is received in the sheathing member and then the sheathing member is sealed.

A pouch-shaped secondary battery includes an electrode assembly in which a positive electrode plate and a negative electrode plate are disposed spaced apart from each other so as to be opposite each other, an electrode lead disposed so as to extend from the electrode assembly, and a pouch sheathing member configured to receive the electrode assembly and an electrolytic solution.

The electrode lead, which is a portion that is connected to the electrode assembly and is exposed out of the pouch sheathing member, serves as an electrode terminal that is capable of being electrically connected to another secondary battery or an external device. The electrode lead may be connected to an electrode tab directly connected to the electrode assembly. Here, at least one positive electrode tab and at least one negative electrode tab may be connected to a positive electrode lead and a negative electrode lead, respectively.

A battery cell constituted by the pouch-shaped secondary battery has an operation voltage of about 2.5 V to 4.2 V. In the case in which output voltage higher than the operation voltage is required, therefore, a plurality of battery cells is connected to each other in series to constitute a battery module. In addition, depending on required charging and discharging capacities, a plurality of battery cells is connected to each other in parallel to constitute a battery module. Consequently, the number of battery cells included in a certain battery module may be variously set depending on required output voltage or required charging and discharging capacities.

In general, when a plurality of battery cells is connected to each other in series and/or in parallel to constitute a battery module, electrode leads of the battery cells are welded using a laser such that the electrode leads are electrically connected to each other. For example, referring to FIG. 1, a laser beam is radiated on portions to be welded to perform spot welding in the state in which two battery cells are disposed so as to face each other and electrode tabs, connection portions between electrode tabs and electrode leads, and electrode lead portions of the respective battery cells are brought into vertical contact with each other. At this time, in order to improve weld quality, welding must be performed in the state in which the upper electrode lead and the lower electrode lead are in completely tight contact with each other. In the case in which only a conventional support configured to support the electrode leads is used, however, it is not possible to completely correct an oxidation reaction occurring at the time of welding the electrode leads and short circuit due to spatter, whereby it is not easy to secure tight contact between the electrode leads at the time of laser welding.

Japanese Patent Application Publication No. 2002-164037 discloses technology for welding a battery electrode plate group shelf.

Japanese Patent Application Publication No. 1994-304777 discloses laser welding technology capable of blocking air at a weld portion by spraying nitrogen as an inert gas.

Japanese Patent Application Publication No. 2001-150169 discloses technology capable of reducing the flow rate of assistant gas that is used when non-oxidation cutting is performed using a laser processing machine for cutting.

Japanese Patent Application Publication No. 2016-018756 discloses technology for supplying assistant gas to a laser light radiation area in an inner case in the state in which one end of an outer case is in contact with a protective plate in an electrode assembly manufacturing method.

However, none of the above documents discloses an upper tight-contact jig having a dual structure including a ring-shaped spray portion configured to spray nitrogen gas in order to eliminate an oxidation reaction and spatter deposition occurring at the time of welding.

Such a dual structure is technology for spraying nitrogen to a weld portion in order to form a nitrogen atmosphere and forming an ascending air current such that fumes and spatter generated at the time of subsequent welding are not discharged to the outside but are well introduced into an inner suction portion.

PRIOR ART DOCUMENTS

Patent Documents

Japanese Patent Application Publication No. 2002-164037

Japanese Patent Application Publication No. 1994-304777

Japanese Patent Application Publication No. 2001-150169

Japanese Patent Application Publication No. 2016-018756

DISCLOSURE

Technical Problem

The present invention has been made in view of the above problems, and it is an object of the present invention to provide a tight-contact jig for secondary battery tab laser welding including an upper tight-contact jig including a ring-shaped spray portion capable of performing surface spraying in order to inhibit deterioration in weld quality due to reaction with hydrogen or oxygen in air at the time of laser welding for forming an electrode terminal and to inhibit the occurrence of short circuit due to deposition of spatter generated at the time of welding and a welding method.

Technical Solution

In order to accomplish the above object, the present invention provides an upper tight-contact jig for welding used to manufacture an electrode terminal, the upper tight-contact jig including a ring-shaped spray portion (111) configured to spray an inert gas so as to be brought into tight contact with one surface of a weld portion of a plurality of secondary batteries.

Also, the weld portion may be any one of an electrode tab, an electrode tab and an electrode lead, and an electrode lead.

Also, a ring-shaped central portion (112) of the ring-shaped spray portion may suction the sprayed inert gas and may discharge the suctioned inert gas to the outside.

Also, the upper tight-contact jig may include an outer upper tight-contact jig (110) configured to define the outer surface of the ring-shaped spray portion and an inner upper tight-contact jig (120) configured to define the inner surface of the ring-shaped spray portion.

Also, the outer upper tight-contact jig may be provided in a side surface thereof with a gas introduction port (113) configured to allow the inert gas to be introduced therethrough.

Also, the sectional area of the ring-shaped spray portion may gradually decrease from the upper surface to the bottom surface of the upper tight-contact jig.

Also, the ring-shaped spray portion may be bent once or more while being formed from the upper surface to the bottom surface of the upper tight-contact jig.

Also, the bottom surface of the outer upper tight-contact jig may abut the weld portion and the bottom surface of the inner upper tight-contact jig may be spaced apart therefrom by a predetermined height to form the ring-shaped spray portion.

Also, the spray pressure of the sprayed inert gas may range from 0.1 MPa to 0.5 MPa.

Also, in order to accomplish the above object, the present invention provides a tight-contact jig for welding including the upper tight-contact jig and a lower tight-contact jig formed so as to be brought into tight contact with the other surface of the weld portion in a direction opposite the upper tight-contact jig.

Also, the upper tight-contact jig may include an upper connection portion configured to move upwards and downwards or leftwards and rightwards in order to support one surface of the weld portion in tight contact therewith, and the lower tight-contact jig may include a lower connection portion configured to move upwards and downwards or leftwards and rightwards in order to support the other surface of the weld portion in tight contact therewith.

Also, one end of the upper connection portion may be connected to the lower tight-contact jig, and one end of the lower connection portion may be connected to the upper tight-contact jig.

Also, the upper tight-contact jig and the lower tight-contact jig may be formed in a vertically open shape in order to perform welding in the state of being in tight contact with each other at a surface opposite the weld portion.

Also, in order to accomplish the above object, the present invention provides a welding method for manufacturing an electrode terminal, the welding method including a first step of vertically overlapping welding targets of a weld portion, the weld portion being any one of a plurality of electrode tabs, an electrode tab and an electrode lead, and an electrode lead, a second step of positioning an upper tight-contact jig and a lower tight-contact jig so as to be brought into tight contact with the weld portion, a third step of pressing the upper tight-contact jig toward the upper surface of the weld portion, the upper tight-contact jig including a ring-shaped spray portion (111) configured to spray an inert gas so as to be brought into tight contact with the upper surface of the weld portion, a fourth step of pressing the lower tight-contact jig toward the lower surface of the weld portion so as to be brought into tight contact with the lower surface of the weld portion, and a fifth step of irradiating the welding targets of the weld portion with a laser beam.

Also, the inert gas sprayed through the ring-shaped spray portion may be suctioned through a ring-shaped central portion of the ring-shaped spray portion.

Also, the upper tight-contact jig may include an outer upper tight-contact jig (110) configured to define the outer surface of the ring-shaped spray portion and an inner upper tight-contact jig (120) configured to define the inner surface of the ring-shaped spray portion.

Also, in order to accomplish the above object, the present invention provides a battery cell manufactured using the welding method for manufacturing the electrode terminal.

In addition, the present invention provides a device using the battery cell as an energy source.

DESCRIPTION OF DRAWINGS

FIG. 1 is a schematic view showing a welding system using a conventional jig.

FIG. 2 is a photograph showing an oxidation phenomenon and holes generated at a welded surface formed using the conventional jig.

FIG. 3 is a photograph showing the section of a weld portion formed using the conventional jig.

FIG. 4 is a photograph showing spatter formed in the conventional jig after welding using the jig.

FIG. 5 is a plan view of an outer upper tight-contact jig according to an embodiment of the present invention.

FIG. 6 is a plan view of an inner upper tight-contact jig according to an embodiment of the present invention.

FIG. 7 is a perspective view of an upper tight-contact jig in which the outer upper tight-contact jig and the inner upper tight-contact jig according to the embodiment of the present invention are coupled to each other.

FIG. 8 is a long-direction (A-A) sectional view of the upper tight-contact jig in which the outer upper tight-contact jig and the inner upper tight-contact jig according to the embodiment of the present invention are coupled to each other.

FIG. 9 is a short-direction (B-B) sectional view of the upper tight-contact jig in which the outer upper tight-contact jig and the inner upper tight-contact jig according to the embodiment of the present invention are coupled to each other.

FIG. 10 is a sectional view of a laser welding unit having a tight-contact jig according to an embodiment of the present invention coupled thereto.

FIG. 11 is a photograph showing an oxidation phenomenon and holes generated at a welded surface formed using the upper tight-contact jig according to the embodiment of the present invention.

FIG. 12 is a photograph showing the section of a weld portion formed using the upper tight-contact jig according to the embodiment of the present invention.

FIG. 13 is a photograph showing spatter formed in the upper tight-contact jig according to the embodiment of the present invention after welding using the jig.

FIG. 14 is a sectional view showing lead welding of the laser welding unit having the tight-contact jig according to the embodiment of the present invention coupled thereto.

FIG. 15 is a view schematically showing two battery cells connected to each other in series in accordance with an embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, the present invention will be described in more detail.

FIG. 1 is a schematic view showing a welding system using a conventional jig.

A pouch-shaped secondary battery includes an electrode assembly in which a positive electrode plate and a negative electrode plate are disposed spaced apart from each other so as to be opposite each other, an electrode lead disposed so as to extend from the electrode assembly, and a pouch sheathing member configured to receive the electrode assembly and an electrolytic solution.

The electrode lead, which is a portion that is connected to the electrode assembly and is exposed out of the pouch sheathing member, serves as an electrode terminal that is capable of being electrically connected to another secondary battery or an external device. The electrode lead may be connected to an electrode tab directly connected to the electrode assembly. Here, at least one positive electrode tab and at least one negative electrode tab may be connected to a positive electrode lead and a negative electrode lead, respectively.

A battery cell constituted by the pouch-shaped secondary battery has an operation voltage of about 2.5 V to 4.2 V. In the case in which output voltage higher than the operation voltage is required, therefore, a plurality of battery cells is connected to each other in series to constitute a battery module. In addition, depending on required charging and discharging capacities, a plurality of battery cells is connected to each other in parallel to constitute a battery module. Consequently, the number of battery cells included in a certain battery module may be variously set depending on required output voltage or required charging and discharging capacities.

In general, when a plurality of battery cells is connected to each other in series and/or in parallel to constitute a battery module, electrode leads 2 of the battery cells are welded using a laser 1 such that the electrode leads are electrically connected to each other. Referring to FIG. 1, a laser beam is radiated on portions to be welded to perform spot welding in the state in which two battery cells are disposed so as to face each other and electrode lead portions of the respective battery cells are brought into vertical contact with each other. At this time, in order to improve weld quality, welding must be performed in the state in which the upper electrode lead and the lower electrode lead are in completely tight contact with each other. In the case in which only a conventional support configured to support the electrode leads is used, however, it is not possible to completely correct uneven surface states of the electrode leads, whereby it is not easy to secure tight contact between the electrode leads at the time of laser welding.

COMPARATIVE EXAMPLE 1

FIG. 2 is a photograph showing an oxidation phenomenon and holes generated at a welded surface formed using the conventional jig.

For the conventional tight-contact jig, a nitrogen supply hole was formed in order to supply nitrogen, whereby the flow speed of sprayed nitrogen gas was high and the flow rate of the sprayed nitrogen gas was low. As a result, nitrogen gas having a spray pressure of 0.01 MPa or higher could not be used.

In addition, the portion of the jig abutting a weld portion was spaced apart therefrom by about 4 mm, whereby it was not easy to inhibit oxidation reaction due to the nitrogen gas.

In addition, the nitrogen gas was directly sprayed to the weld portion, whereby a phenomenon in which beads scattered when the weld portion was melted occurred.

When observing a welded surface portion formed using the conventional tight-contact jig having the nitrogen supply hole formed therein, it can be seen that a reducing atmosphere due to the sprayed nitrogen gas was not uniformly formed at the weld portion, whereby an oxidation phenomenon partially occurred and holes were formed in a part of the welding portion.

FIG. 3 is a photograph showing the section of a weld portion formed using the conventional jig.

When observing a welded end, it can be seen that a uniform reducing atmosphere due to nitrogen gas was not formed at the weld portion, whereby welding thickness was not uniform and holes were formed in a part of the weld portion.

COMPARATIVE EXAMPLE 2

FIG. 4 is a photograph showing spatter formed in the conventional jig after welding using the jig.

For the conventional tight-contact jig, it can be seen that a phenomenon in which spatter is cumulatively piled up at the end of the tight-contact jig due to the supply of nitrogen through the nitrogen supply hole occurred.

In the tight-contact jig for welding, the spatter is cumulatively piled up at the end of the tight-contact jig. When the spatter accumulates, a quality problem, such as short circuit, is caused afterwards. Therefore, it is necessary to periodically clean and replace the tight-contact jig.

As another method of solving the above problem, techniques for ablating spatter that has accumulated due to the use of lasers after manufacture of a predetermined quantity of products through radiation of a laser beam in the state in which upper and lower tight-contact jigs are disposed in tight contact with each other such that no battery cell is disposed therebetween may be used.

FIG. 5 is a plan view of an outer upper tight-contact jig according to an embodiment of the present invention.

FIG. 6 is a plan view of an inner upper tight-contact jig according to an embodiment of the present invention.

FIG. 7 is a perspective view of an upper tight-contact jig in which the outer upper tight-contact jig and the inner upper tight-contact jig according to the embodiment of the present invention are coupled to each other.

It is possible to provide an upper tight-contact jig for welding configured to manufacture an electrode terminal including a ring-shaped spray portion 111 configured to spray an inert gas so as to be brought into tight contact with one surface of a weld portion of a plurality of secondary batteries.

The kind of the inert gas is not restricted as long as the inert gas does not react with hydrogen and/or oxygen in air. Preferably, the inert gas is nitrogen gas.

The ring-shaped spray portion 111 is formed in a circular shape, an oval shape, a rectangular shape, a square shape, or an amorphous shape, and the inert gas is not sprayed through a ring-shaped central portion.

Preferably, opposite ends of the ring-shaped spray portion have hemispherical shapes having the same diameter, and a ring-shaped extension portion formed as the result of extension of the opposite ends has a width equal to the diameter of the hemisphere, whereby the ring-shaped spray portion has a rectangular shape.

The ring-shaped spray portion may spray the inert gas through only a part that forms the outer surface of the ring shape.

The ring-shaped spray portion is a surface-shaped spray portion, rather than a nozzle-shaped spray port.

The weld portion may be any one of an electrode tab, an electrode tab and an electrode lead, and an electrode lead.

The ring-shaped central portion 112 of the ring-shaped spray portion may suction the sprayed inert gas and may discharge the suctioned inert gas to the outside.

That is, nitrogen gas introduced through the ring-shaped spray portion may be suctioned through the ring-shaped central portion and may be discharged to the outside. As the nitrogen gas flows as described above, a reducing atmosphere may be uniformly formed over the entire weld portion.

A discharge port configured to discharge the suctioned nitrogen gas to the outside may be formed in the laser welding unit.

The upper tight-contact jig may include an outer upper tight-contact jig 110, which defines the outer surface of the ring-shaped spray portion, and an inner upper tight-contact jig 120, which defines the inner surface of the ring-shaped spray portion.

A gas introduction port 113, through which the inert gas is introduced, may be formed in the side surface of the outer upper tight-contact jig.

The sectional area of the ring-shaped spray portion may gradually decrease from the upper surface to the bottom surface of the upper tight-contact jig.

The ring-shaped spray portion may be formed as the result of coupling between the outer upper tight-contact jig and the inner upper tight-contact jig, and as the sectional area of the ring-shaped spray portion becomes smaller, a slit of the ring-shaped spray portion abutting the weld portion may be formed so as to be smaller.

The ring-shaped spray portion may be bent once or more while being formed from the upper surface to the bottom surface of the upper tight-contact jig.

As the result of bending, the slit of the ring-shaped spray portion abutting the weld portion may be formed so as to be small.

The bottom surface of the outer upper tight-contact jig may abut the weld portion and the bottom surface of the inner upper tight-contact jig may be spaced apart therefrom by a predetermined height to form the ring-shaped spray portion.

The spray pressure of the sprayed inert gas may range from 0.1 MPa to 0.5 MPa, preferably from 0.15 MPa to 0.4 MPa, more preferably from 0.2 MPa to 0.3 MPa. At this time, the flow rate of the inert gas may be 10 to 30 L/min. If the spray pressure condition is not satisfied, it is not possible to uniformly form a reducing atmosphere at the weld portion through the inert gas.

FIG. 8 is a long-direction sectional view of the upper tight-contact jig in which the outer upper tight-contact jig and the inner upper tight-contact jig according to the embodiment of the present invention are coupled to each other.

FIG. 9 is a short-direction sectional view of the upper tight-contact jig in which the outer upper tight-contact jig and the inner upper tight-contact jig according to the embodiment of the present invention are coupled to each other.

It is possible to provide a tight-contact jig for welding including the upper tight-contact jig and a lower tight-contact jig formed so as to be brought into tight contact with the other surface of the weld portion in a direction opposite the upper tight-contact jig.

The upper tight-contact jig may include an upper connection portion configured to move upwards and downwards or leftwards and rightwards in order to support one surface of the weld portion in tight contact therewith, and the lower tight-contact jig may include a lower connection portion configured to move upwards and downwards or leftwards and rightwards in order to support the other surface of the weld portion in tight contact therewith.

The upper connection portion and/or the lower connection portion may be a first guide rod configured to guide the translation of the upper tight-contact jig and/or the lower tight-contact jig.

The upper connection portion and/or the lower connection portion may be a second guide rod configured to guide the horizontal relative movement of the upper tight-contact jig and/or the lower tight-contact jig.

One end of the upper connection portion may be connected to the lower tight-contact jig, and one end of the lower connection portion may be connected to the upper tight-contact jig.

The upper tight-contact jig and the lower tight-contact jig may be formed in a vertically open shape in order to perform welding in the state of being in tight contact with each other at the surface opposite the weld portion.

FIG. 10 is a sectional view of a laser welding unit having a tight-contact jig according to an embodiment of the present invention coupled thereto.

It is possible to provide a welding method for manufacturing an electrode terminal, the welding method including a first step of vertically overlapping welding targets of a weld portion, which is any one of a plurality of electrode tabs, an electrode tab and an electrode lead, and an electrode lead, a second step of positioning an upper tight-contact jig and a lower tight-contact jig so as to be brought into tight contact with the weld portion, a third step of pressing the upper tight-contact jig toward the upper surface of the weld portion, the upper tight-contact jig including a ring-shaped spray portion 111 configured to spray an inert gas so as to be brought into tight contact with the upper surface of the weld portion, a fourth step of pressing the lower tight-contact jig toward the lower surface of the weld portion so as to be brought into tight contact with the lower surface of the weld portion, and a fifth step of irradiating the welding targets of the weld portion with a laser beam.

The inert gas sprayed through the ring-shaped spray portion may be suctioned through the ring-shaped central portion of the ring-shaped spray portion.

The upper tight-contact jig may include an outer upper tight-contact jig 110, which defines the outer surface of the ring-shaped spray portion, and an inner upper tight-contact jig 120, which defines the inner surface of the ring-shaped spray portion.

EXAMPLE 1

FIG. 11 is a photograph showing an oxidation phenomenon and holes generated at a welded surface formed using the upper tight-contact jig according to the embodiment of the present invention.

When observing a weld portion formed using the upper tight-contact jig having the dual structure including the ring-shaped spray portion, it can be seen that a reducing atmosphere due to nitrogen gas was uniformly formed at the weld portion, whereby no oxidation phenomenon occurred, compared to Comparative Example 1.

In addition, it can be seen that a phenomenon in which holes were formed in the weld portion due to abrupt oxidation reaction, which occurred in Comparative Example 1, did not occur.

FIG. 12 is a photograph showing the section of the weld portion formed using the upper tight-contact jig according to the embodiment of the present invention.

It can be seen that, for the upper tight-contact jig including the ring-shaped spray portion having the dual structure, nitrogen spray pressure was 0.03 MPa or higher, the flow rate of sprayed nitrogen gas was increased, and the flow speed of the sprayed nitrogen gas was decreased, whereby an oxidation reaction was inhibited and thus the section of the weld portion was uniform, compared to Comparative Example.

FIG. 13 is a photograph showing spatter formed in the upper tight-contact jig according to the embodiment of the present invention after welding using the jig.

It can be seen that nitrogen gas sprayed through the ring-shaped spray portion having the dual structure was suctioned through the ring-shaped central portion, whereby spatter was not deposited on the end of the tight-contact jig but was continuously discharged and thus the interior of the tight-contact jig was clean, compared to Comparative Example.

Also, in order to accomplish the above object, the present invention may provide a battery cell manufactured using the welding method for manufacturing the electrode terminal.

The present invention may provide a battery pack including two or more battery cells.

In addition, the present invention may provide a device using the battery cell as an energy source.

The device may be a mobile phone, a portable computer, a smartphone, a smart pad, a netbook computer, a light electronic vehicle (LEV), an electric vehicle, a hybrid electric vehicle, a plug-in hybrid electric vehicle, or a power storage apparatus.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

1: Laser
2: Lead
3: Support
100: Upper tight-contact jig
110: Outer upper tight-contact jig
111: Ring-shaped spray portion
112: Ring-shaped central portion
113: Gas introduction port
120: Inner upper tight-contact jig
200: Lower tight-contact jig
300: Upper connection portion
400: Lower connection portion

INDUSTRIAL APPLICABILITY

As is apparent from the above description, the tight-contact jig for secondary battery tab laser welding and the welding method have an effect in that it is possible to prevent reaction with hydrogen and/or oxygen in air at the weld portion at the time of welding, whereby it is possible to prevent deterioration in weld quality.

In addition, the tight-contact jig for secondary battery tab laser welding and the welding method have an effect in that it is possible to prevent occurrence of a phenomenon in which spatter is continuously generated and cumulatively deposited in the jig.

In addition, the tight-contact jig for secondary battery tab laser welding and the welding method have an effect in that it is possible to prevent occurrence of short circuit as the result of the deposited spatter being introduced to the lead of the battery cell.

In addition, the tight-contact jig for secondary battery tab laser welding and the welding method have an effect in that nitrogen is sprayed through the ring-shaped spray portion, and therefore it is possible to decrease flow speed of the sprayed nitrogen and to increase flow rate of the sprayed nitrogen, whereby it is possible to realize surface-shaped spray, rather than conventional dot-shaped spray.

In addition, the tight-contact jig for secondary battery tab laser welding and the welding method have an effect in that it is possible to minimize physical space in which spatter may be burned and to form an ascending air current such that the spatter is well transferred to the ring-shaped central portion.

The invention claimed is:

1. A tight-contact jig for welding used to manufacture an electrode terminal, the tight-contact jig comprising:

an upper tight-contact jig comprising: a ring-shaped spray portion configured to spray an inert gas, the ring-shaped spray portion configured to be brought into tight contact with a first surface of a weld portion of a plurality of secondary batteries, the upper tight-contact jig including an upper connection portion configured to move upwards and downwards or leftwards and rightwards to support the first surface of the weld portion in tight contact therewith; and a lower tight-contact jig configured to be brought into tight contact with a second surface of the weld portion opposite from the first surface, the lower tight-contact jig including a lower connection portion configured to move upwards and downwards or leftwards and rightwards to support the second surface of the weld portion in tight contact therewith.

2. The tight-contact jig according to claim 1, wherein the tight-contact jig is configured to hold any one of: an electrode tab, a combination of an electrode tab and an electrode lead, or an electrode lead.

3. The tight-contact jig according to claim 1, wherein the ring-shaped spray portion includes a ring-shaped central portion configured to suction the sprayed inert gas and to discharge the suctioned inert gas to an outside of the upper tight-contact jig.

4. The tight-contact jig according to claim 1, wherein the upper tight-contact jig comprises an outer upper tight-contact jig defining an outer surface of the ring-shaped spray portion and an inner upper tight-contact jig defining an inner surface of the ring-shaped spray portion.

5. The tight-contact jig according to claim 4, wherein a side surface of the outer upper tight-contact jig has a gas introduction port therein that is configured to allow the inert gas to be introduced therethrough.

6. The tight-contact jig according to claim 4, wherein a sectional area of the ring-shaped spray portion gradually decreases from an upper surface of the upper tight-contact jig to a bottom surface of the upper tight-contact jig.

7. The tight-contact jig according to claim 4, wherein the ring-shaped spray portion is bent once or more between an upper surface of the upper tight-contact jig and a bottom surface of the upper tight-contact jig.

8. The tight-contact jig according to claim 4, wherein a bottom surface of the outer upper tight-contact jig is configured to abut the weld portion and a bottom surface of the inner upper tight-contact jig is spaced apart from a confronting surface of the outer upper tight-contact jig by a predetermined height to form the ring-shaped spray portion.

9. The tight-contact jig according to claim 1, wherein a spray pressure of the inert gas ranges from 0.1 MPa to 0.5 MPa.

10. The tight-contact jig according to claim 1, wherein one end of the upper connection portion is connected to the lower tight-contact jig, and one end of the lower connection portion is connected to the upper tight-contact jig.

11. A tight-contact jig for welding used to manufacture an electrode terminal, the tight-contact jig comprising:

an upper tight-contact jig including a ring-shaped spray portion configured to spray an inert gas, the ring-shaped spray portion configured to be brought into tight contact with a first surface of a weld portion of a plurality of secondary batteries; and a lower tight-contact jig configured to be brought into tight contact with a second surface of the weld portion opposite from the first surface, wherein the upper tight-contact jig and the lower tight-contact jig are formed in a vertically open shape and are configured to perform welding in a state of being in tight contact with each other at a surface opposite the weld portion.

12. A welding method for manufacturing an electrode terminal, the welding method comprising:

vertically overlapping welding targets of a weld portion, the weld portion being any one of: a plurality of electrode tabs, a combination of an electrode tab and an electrode lead, or an electrode lead;

positioning an upper tight-contact jig and a lower tight-contact jig in tight contact with the weld portion, including moving an upper connection portion of the upper tight-contact jig upwards and downwards or leftwards and rightwards to support the upper surface of the weld portion in tight contact therewith, and including moving a lower connection portion of the lower tight-contact jig upwards and downwards or leftwards and rightwards to support the lower surface of the weld portion in tight contact therewith;

pressing the upper tight-contact jig against an upper surface of the weld portion, the upper tight-contact jig comprising a ring-shaped spray portion configured to spray an inert gas;

pressing the lower tight-contact jig against a lower surface of the weld portion; and irradiating the welding targets of the weld portion with a laser beam.

13. The welding method according to claim 12, further comprising spraying the inert gas through the ring-shaped spray portion by suctioning the inert gas through a ring-shaped central portion of the ring-shaped spray portion.

14. The welding method according to claim 12, wherein the upper tight-contact jig comprises an outer upper tight-contact jig defining an outer surface of the ring-shaped spray portion and an inner upper tight-contact jig defining an inner surface of the ring-shaped spray portion.

15. A battery cell manufactured using the welding method according to claim 12.

16. A device including the battery cell according to claim 15.

* * * * *